United States Patent [19]

Lim

[11] Patent Number: 5,309,478

[45] Date of Patent: May 3, 1994

[54] METHOD AND APPARATUS FOR HYBRID ANALOG/DIGITAL SIGNAL PROCESSING

[75] Inventor: Jae S. Lim, Winchester, Mass.

[73] Assignee: Massachusetts Institute of Technology, Cambridge, Mass.

[21] Appl. No.: 484,928

[22] Filed: Feb. 23, 1990

Related U.S. Application Data

[63] Continuation-in-part of Ser. No. 471,532, Jan. 29, 1990, abandoned.

[51] Int. Cl.⁵ ............................................. H04B 15/00
[52] U.S. Cl. ...................................... 375/58; 375/60; 455/72
[58] Field of Search ...................... 375/121, 37, 58, 28, 375/38; 370/7; 455/72

[56] References Cited

U.S. PATENT DOCUMENTS

| | | | |
|---|---|---|---|
| 4,403,331 | 9/1983 | Halpern et al. | 375/37 |
| 4,601,045 | 7/1986 | Lubarsky | 375/58 X |
| 4,641,327 | 2/1987 | Wei | 375/38 |
| 4,677,671 | 6/1987 | Galand et al. | 375/37 |
| 4,700,361 | 10/1987 | Todd et al. | 375/27 |
| 4,700,362 | 10/1987 | Todd et al. | 375/30 |
| 4,733,401 | 3/1988 | Longstaff | 375/37 |
| 4,839,906 | 6/1989 | Leveque et al. | 375/37 |
| 4,866,442 | 9/1989 | Steim et al. | 375/28 |

OTHER PUBLICATIONS

Schreiber, William F., "Improved Television Systems: NTSC and Beyond," SMPTE Journal, vol. 66, No. 8, pp. 734–744, Aug. 1987.

Schreiber, William F., "Psychophysics and the Improvement of Television Image Quality," SMPTE Journal, vol. 93, No. 8, pp. 717–725, Aug. 1984.

Schreiber et al., "Reliable EDTV/HDTV Transmission in Low-Quality Analog Channels," SMPTE Journal, pp. 496–503 (Jul. 1989).

"Channel-Compatible 6-MHz HDTV Distribution Systems", SMPTE Journal (Jan. 1988).

Two Dimensional Signal and Image Processing, (1990), Prentice Hall.

Primary Examiner—Curtis Kuntz
Assistant Examiner—Young Tse
Attorney, Agent, or Firm—Fish & Richardson

[57] ABSTRACT

Method and apparatus for selectively increasing, decreasing or leaving unaffected the signal-to-noise ratio of portions of an analog transmission signal. As a result it is possible to increase the signal-to-noise ratio of some analog values, decrease the signal-to-noise ratio of other analog values, and leave the signal-to-noise ratio of the remaining values of a given analog signal, so as to better utilize a transmission channel according to the characteristics of the signal to be transmitted.

33 Claims, 10 Drawing Sheets

TRANSMITTER 20

RECEIVER 120

METHOD AND APPARATUS FOR HYBRID ANALOG/DIGITAL SIGNAL PROCESSING

BACKGROUND OF THE INVENTION

This application is a continuation in part of U.S. Ser. No. 07/471,532, filed Jan. 29, 1990, now abandoned.

The present invention relates to method and apparatus for more robust and/or more efficient signal transmission.

In signal transmission, such as in video or voice signal broadcasting, an analog signal is often represented entirely in the analog domain, or entirely in the digital domain. For example, in pulse amplitude modulation, a train of pulses of amplitude equal to the analog value is transmitted at regular intervals. In pulse code modulation, the analog value is converted to binary numbers and transmitted as a serial string of bits. There are advantages and disadvantages associated with each of the two domains.

Transmission of analog signals is desired in a variety of applications. But in the transmission of analog signals, such as by radio, cable, satellite, fiber-optics, or wire, the received analog signal may suffer loss of quality due to random noise, interference from other signals, echoes due to multipath transmission, and frequency distortion. As a result, in the case of broadcast radio or television, for example, the image quality at typical home receivers may be substantially degraded compared to the studio signal.

SUMMARY OF THE INVENTION

The present invention provides a method and apparatus for selectively increasing, decreasing or leaving unaffected the signal-to-noise ratio of portions of an analog transmission signal. As a result it is possible to increase the signal-to-noise ratio of some analog values, decrease the signal-to-noise ratio of other analog values, and leave unaffected the signal-to-noise ratio of the remaining values of a given analog signal, so as to better utilize a transmission channel according to the characteristics of the signal to be transmitted. In a first mode of operation, the invention provides a method and apparatus for hybrid analog/digital representation of an analog value to achieve a reduction of channel degradation. In a second mode of operation, added to the first mode of operation, the invention provides a method and apparatus for analog representation of an analog value and B bits of digital information, to achieve more efficient use of a given channel. Preferably the source signal is a video signal or an audio signal, and the hybrid analog/digital or analog representation is based upon transform or subband signal analysis of the source signal.

In one aspect of the invention, a hybrid analog/digital method of signal transmission includes the steps of obtaining an analog value $x_1$ which is desired to be transmitted, representing the analog value $x_1$ with $B_1$ bit(s) of digital information and an analog value $y_1$ by means of a mapping function and transmitting the $B_1$ bit(s) and analog value $y_1$ such that the analog value $y_1$ can be decoded using the $B_1$ bit(s) to obtain a representation of the analog value $x_1$. Preferably, obtaining analog value $x_1$ includes submitting a source signal to transform or subband signal analysis to generate the analog value $x_1$, whereby the source signal may be synthesized from the representation of the analog value $x_1$. The analog value $x_1$ may include a representation of a high energy and/or low frequency component of the source signal.

This method may further include the steps of obtaining an analog value $x_2$ and $B_2$ bit(s) of digital information which are desired to be transmitted, representing the analog value $x_2$ and $B_2$ bit(s) of digital information with an analog value $y_2$, and transmitting the analog value $y_2$ such that a respective representation of the analog value $x_2$ and the $B_2$ bit(s) of digital information can be discerned from analog value $y_2$, whereby analog value $x_2$ and $B_2$ bit(s) of digital information can be transmitted with a single analog value $y_2$. Preferably, obtaining the analog value $x_2$ and $B_2$ bit(s) of digital information includes submitting a source signal to transform or subband signal analysis and processing the output such that the source signal can be represented with the analog value $x_2$ and $B_2$ bit(s) of digital information, whereby a representation of the source signal can be generated based upon the representation of analog value $x_2$ and $B_2$ bit(s) of digital information discerned from analog value $y_2$. The analog value $y_2$ may include a representation of a low energy and/or high frequency component of the source signal.

In another aspect of the invention, a hybrid analog/digital signal transmission system includes a circuit for analyzing a source signal to generate an analog value $x_1$ representative of the source signal, a circuit for representing the analog value $x_1$ with $B_1$ bit(s) of digital information and an analog value $y_1$ by means of a mapping function, and a circuit for transmitting the $B_1$ bit(s) of digital information and analog value $y_1$ such that the analog value $y_1$ can be decoded using the $B_1$ bit(s) to obtain a representation of the analog value $x_1$, whereby a representation of the source signal may be generated based upon the representation of the analog value $x_1$. Preferably, obtaining analog value $x_1$ includes submitting the source signal to transform or subband signal analysis to generate the analog value $x_1$, whereby a representation of the source signal may be synthesized from the representation of the analog value $x_1$. The analog value $x_1$ may include a representation of a high energy component of the source signal.

This system may further include a circuit for obtaining an analog value $x_2$ and $B_2$ bit(s) of digital information, a circuit for representing the analog value $x_2$ and $B_2$ bit(s) of digital information with an analog value $y_2$, and a circuit for transmitting the analog value $y_2$ such that a respective representation of the analog value $x_2$ and the $B_2$ bit(s) of digital information can be discerned from analog value $y_2$, whereby analog value $x_2$ and the $B_2$ bit(s) of digital information can be transmitted with a single analog value $y_2$. Preferably, obtaining the analog value $x_2$ and $B_2$ bit(s) of digital information includes submitting a source signal to transform or subband signal analysis and processing the output such that the source signal can be represented with the analog value $x_2$ and $B_2$ bit(s) of digital information, whereby a representation of the source signal can be generated based upon a representation of analog value $x_2$ and $B_2$ bit(s) of digital information discerned from analog value $y_2$. The analog value $y_2$ may include a representation of a high-frequency component of the source signal. The analog value $y_2$ may include a representation of low energy component of the source signal.

Another aspect of the invention includes a system for receiving a transmission signal which is a hybrid analog/digital representation of an analog value $x_1$, which is representative of a source signal, the system having a circuit for receiving the transmission signal and obtaining an analog value $y_1$ and $B_1$ bit(s) of digital information representative of the analog value $x_1$, a circuit for generating a representation of analog value $x_1$ based upon analog value $y_1$ and the $B_1$ bit(s) of digital information by means of a mapping function, and a circuit for generating a representation of the source signal based upon analog value $x_1$.

This system may further include a second system for receiving a second transmission signal which is an analog representation of an analog value $x_2$ and $B_2$ bit(s) of digital information, which are representative of a second source signal, the second system having a circuit for receiving the second transmission signal and obtaining an analog value $y_2$ representative of the analog value $x_2$ and $B_2$ bit(s) of digital information, a circuit for generating a representation of the analog signal $x_2$ and the $B_2$ bit(s) of digital information based upon analog value $y_2$, and a circuit for generating a representation of the second source signal based upon the representation of analog signal $x_2$ and the $B_2$ bit(s) of digital information.

In a particularly preferred embodiment of the invention, the hybrid analog/digital representation is a value obtained by transform or subband signal analysis and is modulated with a modulation function represented by a modulation factor, and the modulation factor is transmitted as additional digital information along with the modulated value.

Preferably, the $B_1$ bit(s) of digital information is ranging information which enables decoding $y_1$ to obtain $x_1$, and preferably at least part of $B_1$ is expressed by at least part of $B_2$.

Other features and advantages will become apparent from the following detailed description when read in connection with the accompanying drawings.

FIGS. 1(a)-1(g) are graphical representations of one embodiment of mode 1 of the present invention.

FIGS. 2(a)-2(g) are graphical representations of an alternative embodiment of mode 1 of the present invention.

FIG. 3 is a graphical representation of one embodiment of mode 2 of the present invention.

FIGS. 4(a)-4(g) are graphical representations of one embodiment of mode 2 of the present invention.

FIG. 5 is a graphical representation of an alternative embodiment of mode 2 of the present invention.

FIGS. 6(a)-6(g) are graphical representations of an alternative embodiment of mode 2 of the present invention.

FIGS. 7(a)-7(b) are block diagrams of an HDTV transmitter and receiver in practice of the invention.

MODE 1—EXPANDED TRANSMISSION SIGNAL

One mode of the present invention is based on the recognition that a given signal can be expanded into a desired range of amplitude at the transmitter and this expansion can be decoded at the receiver according to a transmitted expansion factor. For example, an analog value x can be represented with B bit(s) and an analog value y. To illustrate, if x is in the range of $-1 \leq x \leq 1$, $B=1$, and y is in the same range of $-1 \leq y \leq 1$, then one bit of information can be used to indicate whether or not x is in the "0" range or "1" range according to whether the bit b has the value of $b=0$ or $b=1$.

Figure 1A:
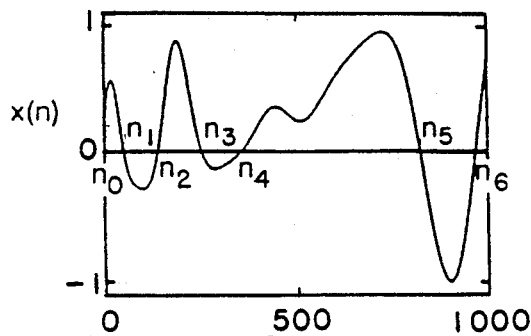

In FIG. 1(a), signal x(n) is shown varying between $-1.0$ and $+1.0$ arbitrary intensity units. For time intervals between $n_0-n_1$, $n_2-n_3$, $n_4-n_5$ and above $n_6$, the signal varies essentially between 0 and 1.0 (range 1) and at other times the signal varies essentially between 0 to $-1.0$ (range 0). The range 0 to $+1.0$ is arbitrarily represented by digital bit $b=1$ and the range from 0 to $-1.0$ is arbitrarily represented by digital bit $b=0$.

Now it is possible to expand the intensity of a portion of signal x(n) into the full range $-1.0$ to $1.0$, as long as a digital bit $b=0$ or $b=1$ representing the original range of the signal is transmitted to the receiver so that the expanded signal can be scaled to normal range. The expanded signal will fare better in the face of channel noise, thus resulting in less channel degradation imposed upon the transmission signal.

Figure 1F:
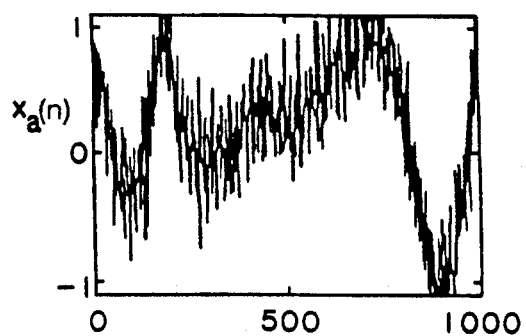
Figure 1E:
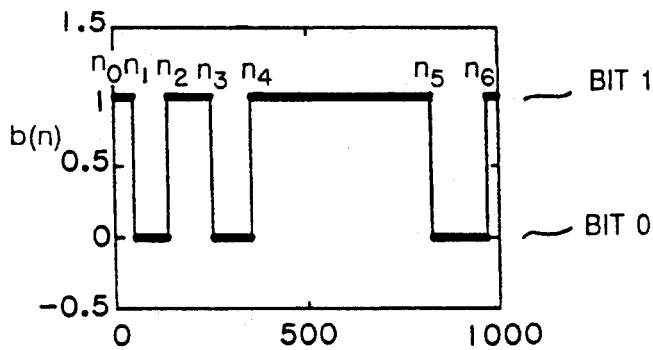
Figure 1D:
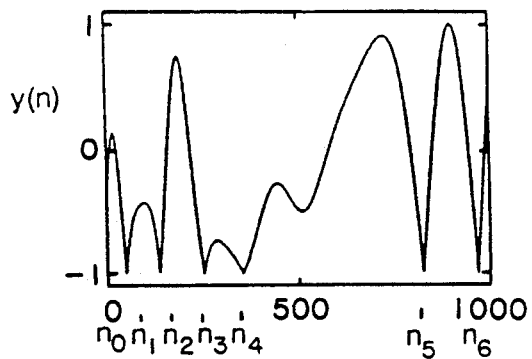
Figure 1G:
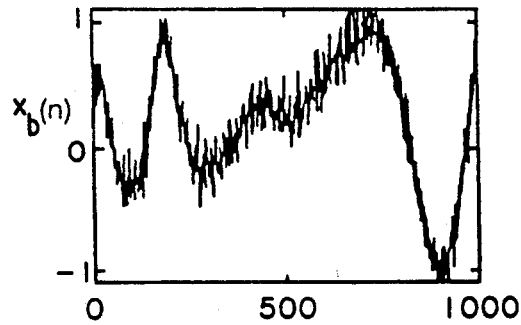
Figure 1B:
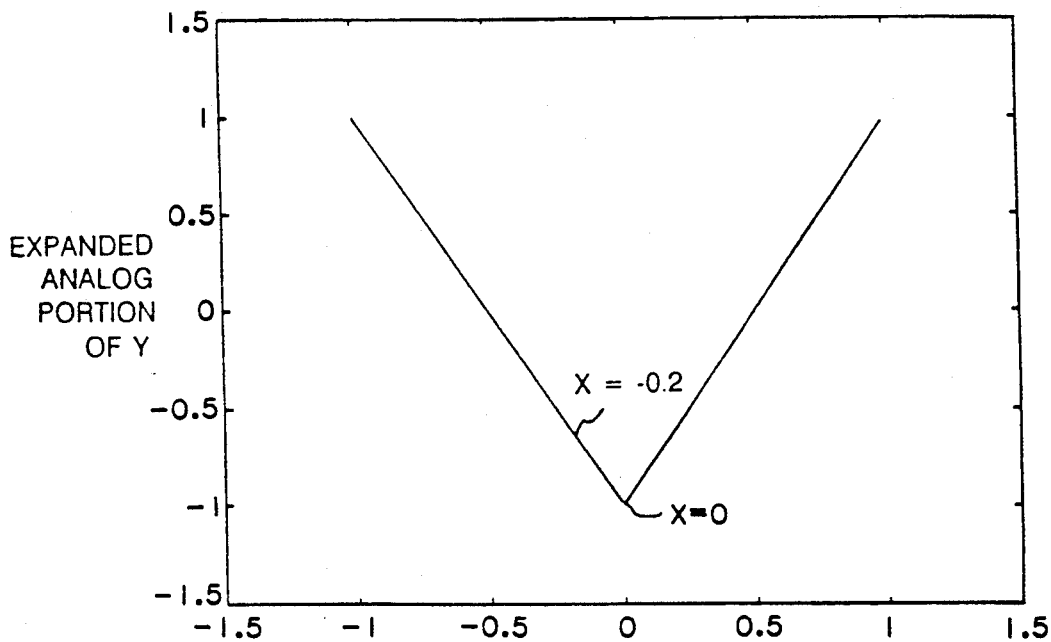

In one embodiment, the signal x(n) is expanded by using the mapping function shown in FIG. 1(b). The value of x(n) is mapped to an expanded analog waveform y(n) according to the mapping function. The accompanying digital bit information b (which represents this expansion) can be obtained by the mapping function shown in FIG. 1(c), where the value of x(n) is mapped to digital information ($b=1$ or $b=0$) according to mapping function shown. The resulting expanded analog signal y(n) is shown in FIG. 1(d) and the resulting digital bit information b(n) is shown in FIG. 1(e). The specific choice of the mapping function in FIG. 1(b) can be made based on the signal characteristics of the analog signal x.

A simple choice of the mapping function is a linear function, as shown in FIG. 1(b). The mapping proceeds as follows: a value is selected for x(n) in FIG. 1(a) which is applied to the mapping function of FIG. 1(b) to obtain the corresponding expanded value of y(n), which is plotted in FIG. 1(d). For example, refer to where x(n) swings below zero between times $n_3$ and $n_4$ in FIG. 1(a). At time $n_3$, x(n) is at zero. This is shown in FIG. 1(b) (see $x=0$) to map to $y=-1$. Thus, in FIG. 1(d), y(n) is shown expanded to $-1.0$ intensity at $n_3$. Halfway between $n_3$ and $n_4$, the amplitude of x(n) is about $-0.2$, which is shown in FIG. 1(b) (see $x=-0.2$) to map to $y=-0.8$. Thus, in FIG. 1(d), y(n) is shown correspondingly expanded to about $-0.8$ halfway between $n_3$ and $n_4$. The balance of the mapping proceeds accordingly.

Figure 1C:
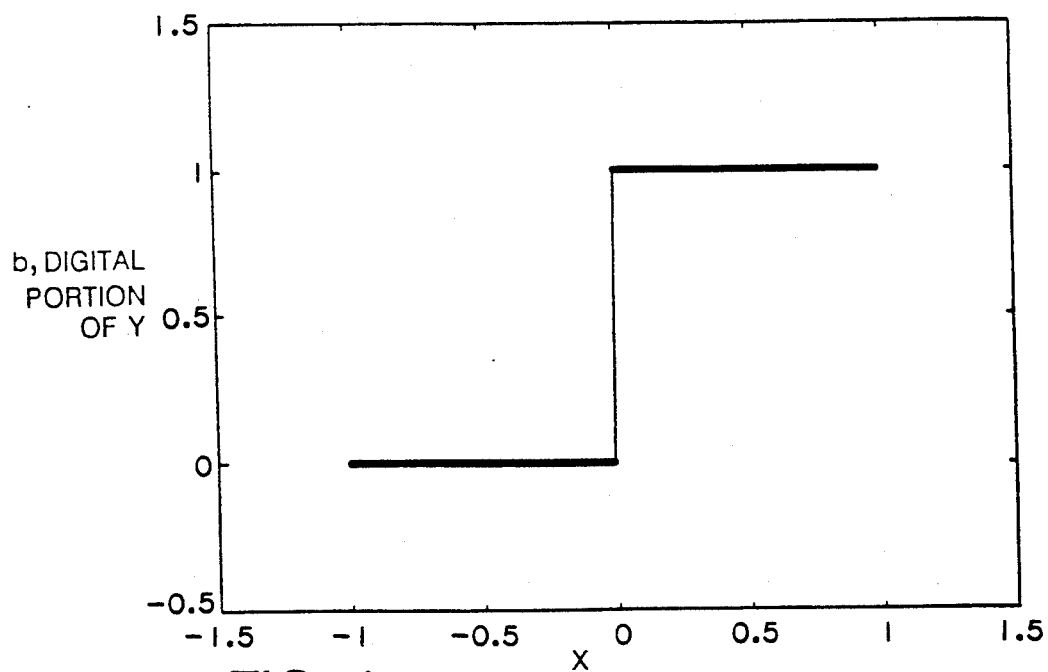

Now the receiver can both scale down the expanded received signal (knowing the mapping functions of FIGS. 1(b) and 1(c)) and properly fit it into the appropriate amplitude range. As a result, a signal can be expanded for more robust transmission in the face of channel noise and can be routinely decoded according to digital side information. This robustness is shown by comparison of FIG. 1(f) and 1(g). FIG. 1(f) shows $x_a(n)$, the signal x(n) conventionally transmitted and then degraded by channel noise. FIG. 1(g) shows $x_b(n)$, decoded from the more robust signal y(n) degraded by the same channel noise. The decoded $x_b(n)$ is a closer representation of the original signal x(n) than is the decoded $x_a(n)$.

Figure 2A:
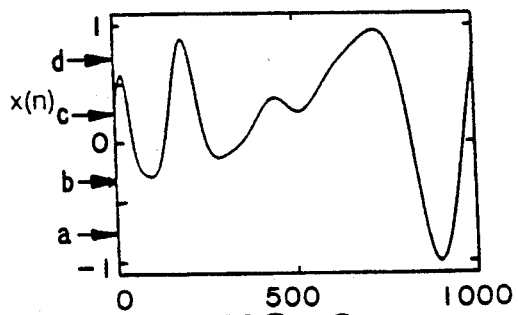
Figure 2F:
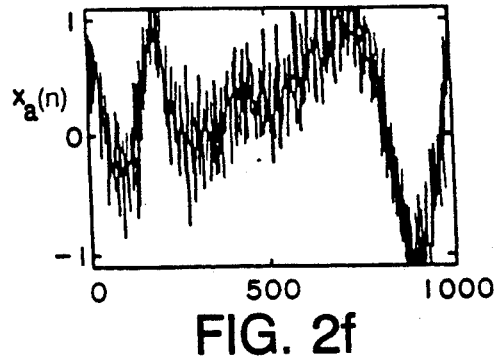
Figure 2E:
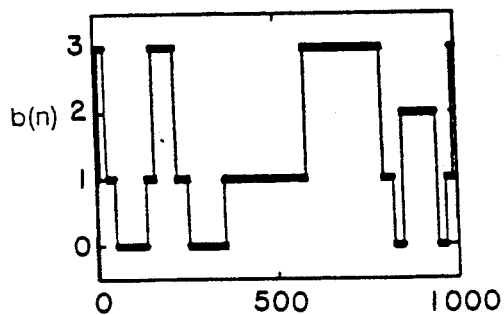
Figure 2D:
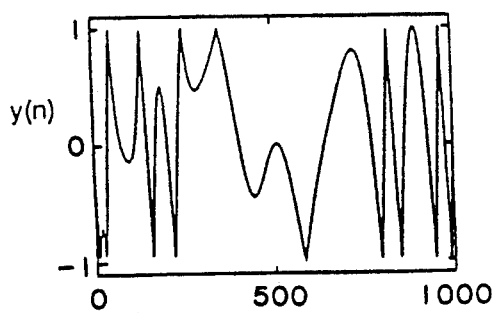

In the above example, the analog signal x(n) was represented by the analog signal y(n) and the 1-bit digital data b(n). The analog signal x(n) can also be represented with greater specificity. For example, FIG. 2(a) shows the same analog signal x(n), but now it is represented by the more expanded analog signal y(n) of FIG. 2(d) (compare with FIG. 1(d)) and 2-bit digital data b(n) of FIG. 2(e) (compare with FIG. 1(e)).

Figure 2G:
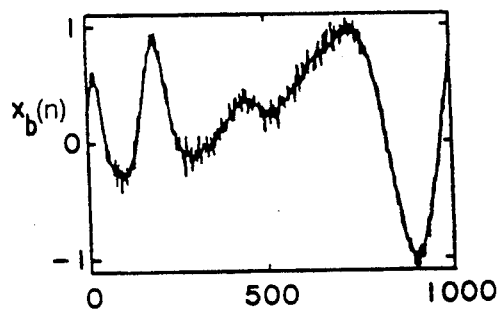
Figure 2B:
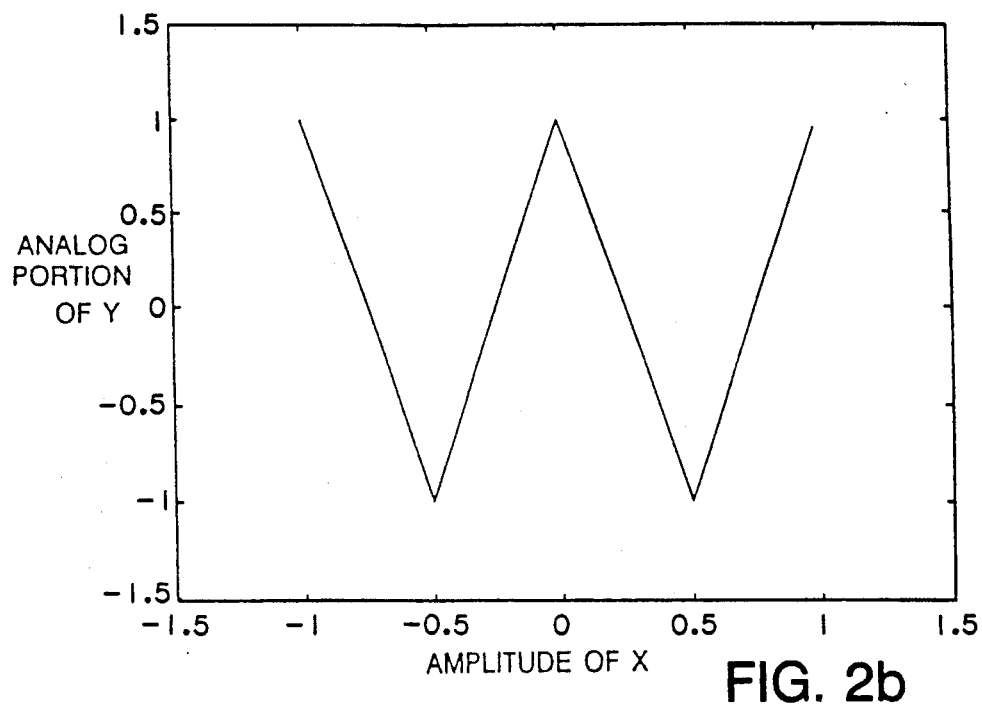
Figure 2C:
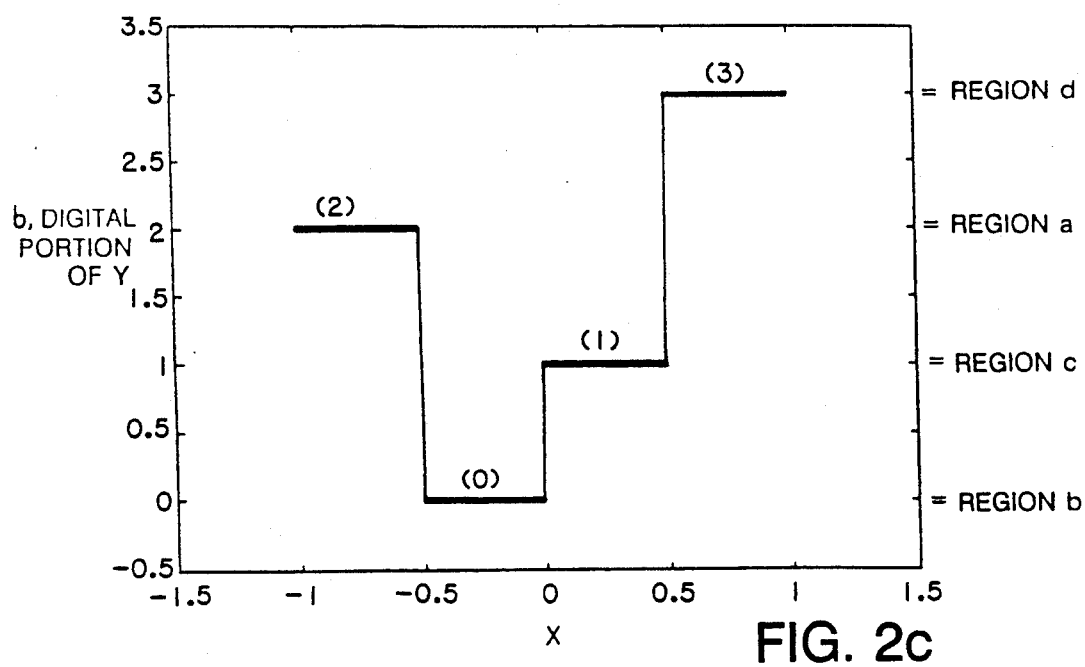

In FIG. 1(b), the mapping function expands x(n) into the total amplitude range −1.0 to 1.0. The same occurs with the mapping function of FIG. 2(b). However, x(n) of FIG. 1(a) is broken into two regions (−1 to 0 and 0 to 1) while x(n) of FIG. 2(a) is divided into four regions a-d, i.e., −1 to −0.5, −0.5 to 0, 0 to 0.5 and 0.5 to 1, respectively. Hence, the digital information signal b(n) of FIG. 1(e) obtains two levels, bit 0 at zero amplitude and bit 1 at one intensity unit to represent the two regions (−1 to 0 and 0 to 1). However, in FIG. 2(b), the digital signal b(n) (see FIG. 2(c)) corresponding to regions a-d (see FIG. 2(e)) is assigned to any one of four levels 0-3, thus requiring transmission of two bits of digital information to represent the four regions (a-d). Therefore, smaller regions of x(n) can be expanded (compare FIG. 2(d) with FIG. 1(d)) and decoded according to b(n), with attendant increased utilization of dynamic range and improved persistence in the presence of channel noise.

One useful embodiment of the invention would enable selectively sending analog values less or more accurately than other values based upon their relative importance. For example, in transform image coding, a signal can be analyzed such that its frequency domain characteristics can be represented by the coefficients derived from the transform analysis. Suppose one analog value represents the DC or low-frequency component, a second analog value represents a mid-frequency component and a third analog value represents a high-frequency component of the analyzed signal. Since the lower-frequency components often carry more signal energy, and the higher-frequency components often carry the least, it is possible to assign two bits to the first analog value, and to greatly expand this value accordingly. one bit to the second analog value, and to expand this value accordingly, and no bits to the third analog value, without an expansion of this signal. (The bits can be transmitted as side information in a conventional manner.) The S/N improvement of the first and second analog values relative to the third analog value would be approximately 12 dB and 6 dB, respectively.

Mode 2—COMPRESSED TRANSMISSION

While the foregoing mode enables more robust transmission of an analog signal, in a second mode of the invention it may also be of interest to provide better utilization of part of the analog signal channel but with less robust transmission. For example, assume an analog value x and digital information b of B bit(s), and a desire to represent x and b with an analog value y. Now suppose the analog value x does not have to be represented accurately, while signal-to-noise ratio of the transmission channel does permit y to be represented accurately. Then, instead of using y to transmit only x, now y can be used to transmit x and additional digital data b of B bit(s). Hence, the amount of digital data that can be transmitted depends upon the acceptable reduction in signal-to-noise ratio and the required accuracy of the received analog value of x.

Figure 3:
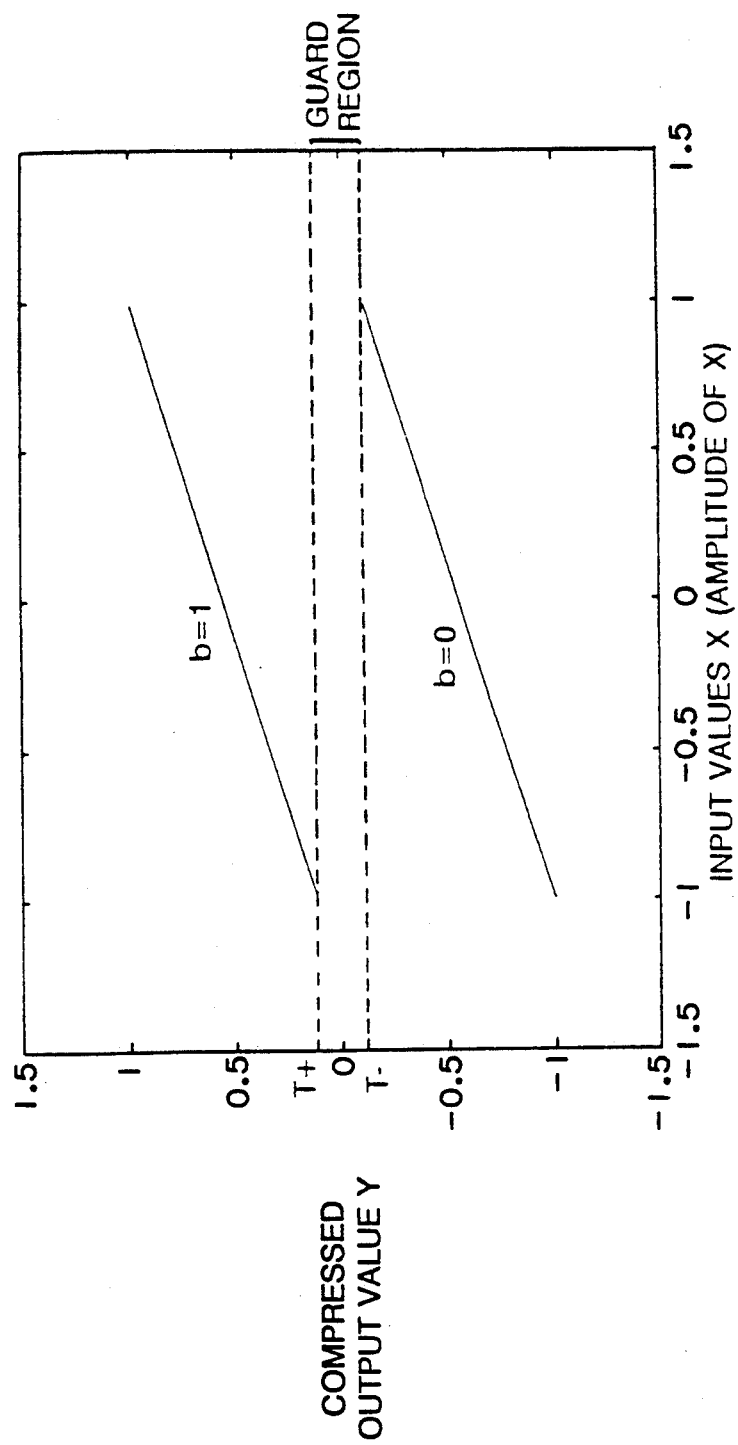

Referring to FIG. 3, suppose that the analog value x is in the range of −1≤x≤1 and y is in the range of −1≤y≤1. The positive region of y is arbitrarily allocated as the Bit 1 domain and the negative region of y as the Bit 0 domain. The x value can be mapped to positive y or negative y, depending upon a single bit of information. As a result, if the analog value x is transmitted in the Bit 1 range, then the analog value y represents Bit 1 information in addition to the analog value x. Likewise, if the analog value is transmitted in the Bit 0 range of the y axis, then the bit 0 digital information is transmitted by the analog signal. At the receiver, the analog value is utilized as an analog value accordingly, however, its bit value is also decoded from its range location.

As shown in FIG. 3, if the bit of information sought to be transmitted is 1, then the x value is mapped to a positive y value from T+ to 1. As a precaution against an error in decoding the bit information due to channel noise, the value of T+ can be chosen to be greater than 0 to allow some guard region which would prevent decoding error. If the one bit of information is 0 value, then the analog value of x can be mapped into the negative y region, where the value of T− is chosen to be less than 0 again to provide a guard region.

The specific choice of mapping function can be made based on the signal characteristics of analog signal x. A simple choice of mapping functions could be a linear function, which was the case in FIG. 3. T-equals −T+ and the functions in FIG. 3 are shifted versions of each other, although these features are not required.

Figure 4A:
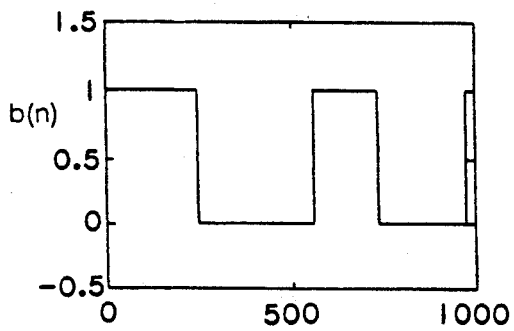
Figure 4B:
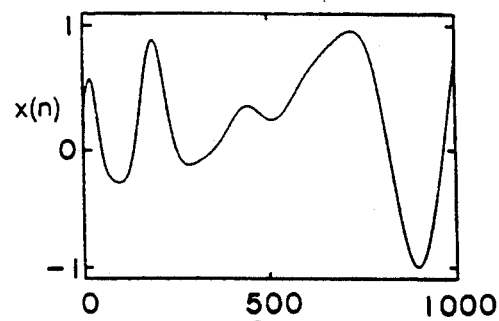
Figure 4C:
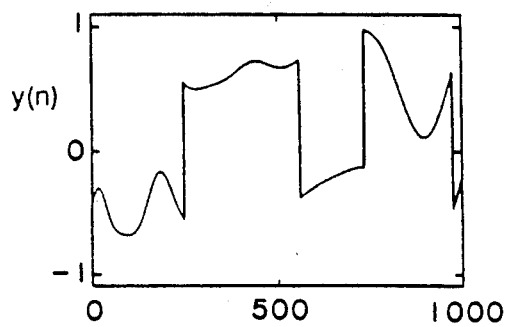
Figure 4D:
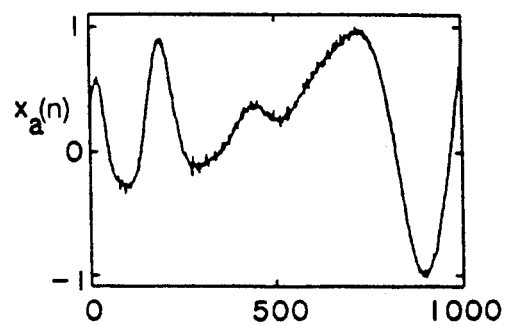
Figure 4E:
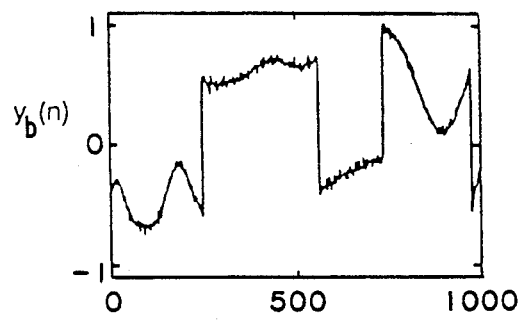
Figure 4G:
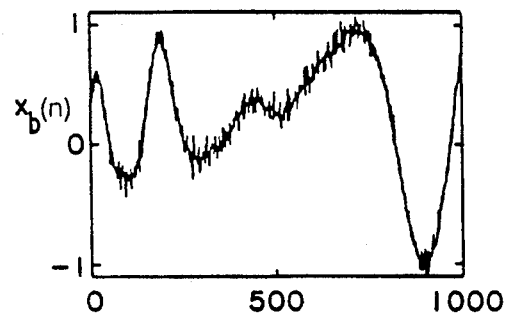
Figure 4F:
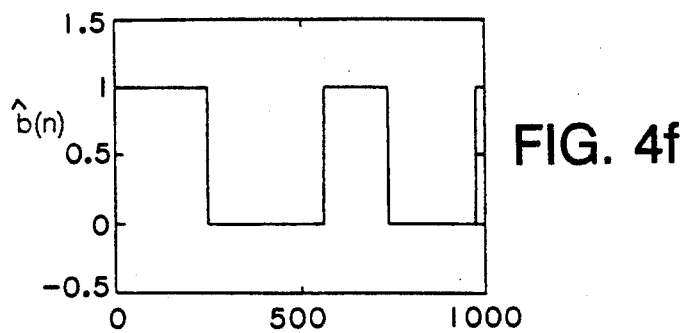

As a specific example, digital data b(n) and analog signal x(n) are shown in FIG. 4(a) and FIG. 4(b) respectively. The analog signal y(n) is obtained from combining b(n) and x(n) according to the mapping function in FIG. 3, and is shown in FIG. 4(c). FIG. 4(d) shows $x_a(n)$, the analog signal x(n) in FIG. 4(b) degraded by channel noise. FIG. 4(e) shows $y_b(n)$, the analog signal y(n) in FIG. 4(c) degraded by the same channel noise. FIG. 4(f) and FIG. 4(g) show the decoded digital data $\overline{b}(n)$ and decoded analog signal $x_b(n)$ respectively. Comparison of $x_a(n)$ in FIG. 4(d) and $x_b(n)$ in FIG. 4(g) shows that $x_b(n)$ has more noise than $x_a(n)$. However, the lower S/N ratio of $x_b(n)$ allows transmitting the digital data b(n) along with x(n), which may be advantageously employed when said signal degradation is less important than extra transmission of digital data.

Figure 5:
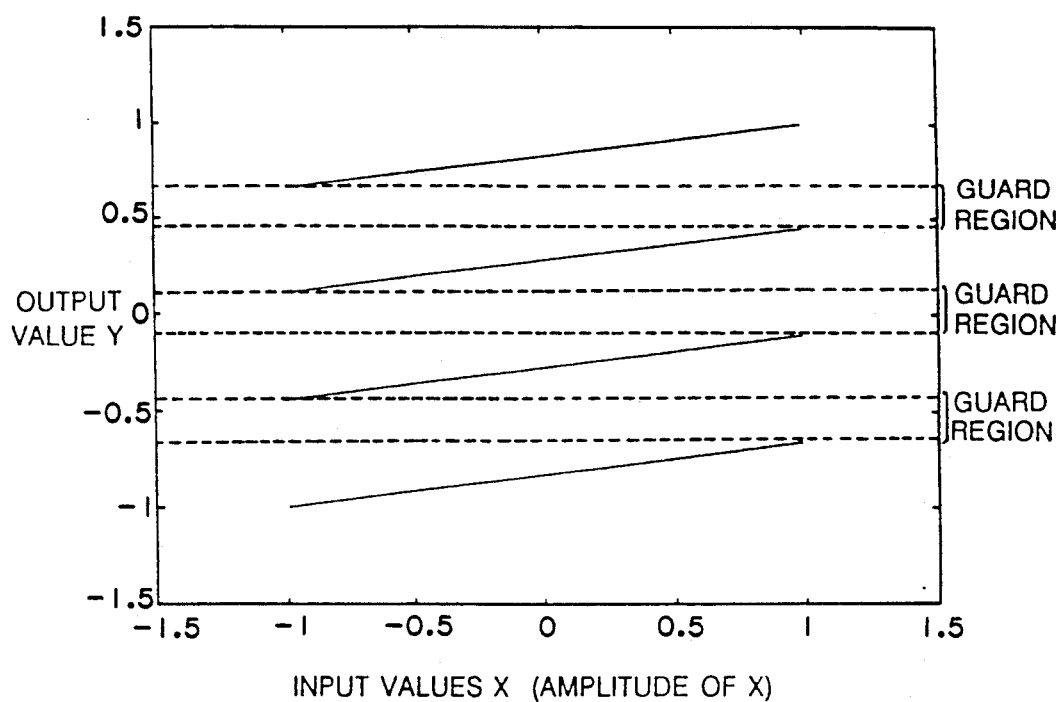
Figure 6A:
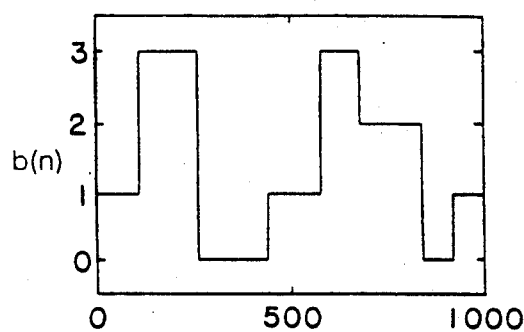
Figure 6B:
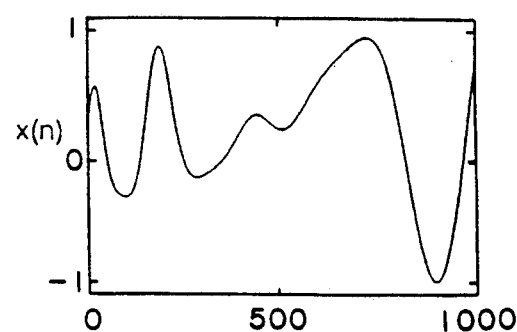
Figure 6C:
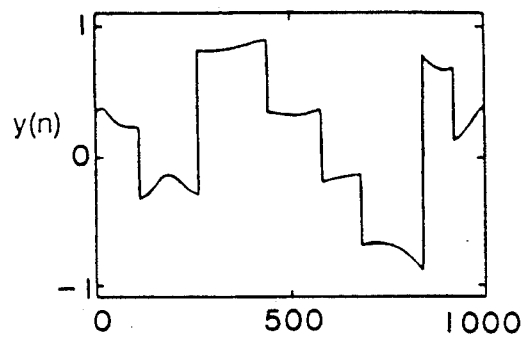
Figure 6D:
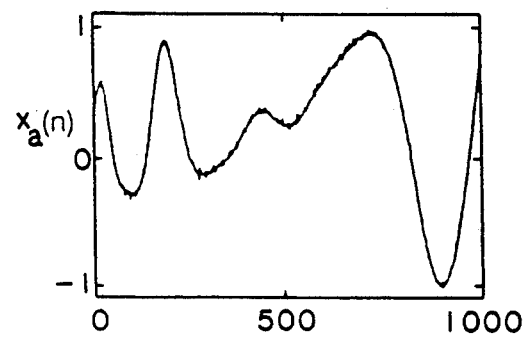
Figure 6E:
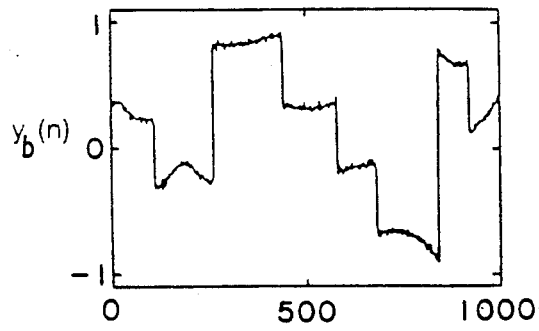
Figure 6G:
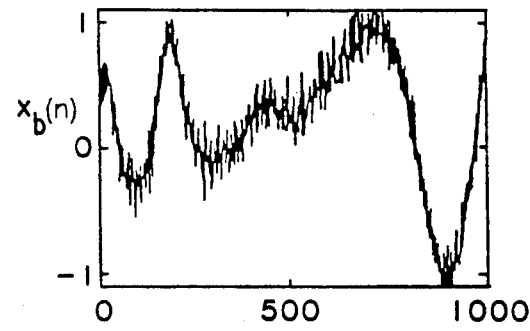
Figure 6F:
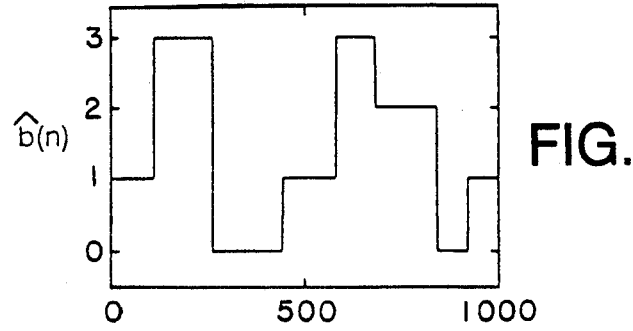

In alternative embodiments of the invention, use of more than two signal ranges enables transmission of a greater amount of digital information. The number of ranges will depend upon the degradation willing to be suffered in the reduced value of analog value x. As a specific example, FIG. 5 and FIG. 6 are the same as FIG. 3 and FIG. 4, except that two-bit digital data (four signal ranges) b(n) and one analog signal x(n) are represented by one analog signal y(n).

One useful embodiment of the invention would enable selectively sending analog values less or more accurately than other values. For example, in transform image coding, suppose one analog value represents a low-frequency or DC component and a second analog value represents a mid-frequency component, and a third analog value represents a high-frequency component. Since the lower-frequency components often carry more signal energy, it is possible to represent the first analog value and no digital information as an analog value, the second analog value and one bit of digital information as an analog value, and the third analog value and two bits of digital information as an analog value. The S/N decrease of the second and third analog values relative to the first analog value would be approximately 6dB and 12dB respectively, assuming that the guard-band regions are not large. This example shows that the method described herein permits de-emphasizing different analog values upon their relative importance.

COMBINATION OF MODE 1 AND MODE 2

The above two modes of operation can be combined to increase the signal-to-noise ratio of some analog values, decrease the signal-to-noise ratio of other analog values, and leave signal-to-noise ratio of remaining analog values unaffected. Hence the invention can be incorporated into a hybrid analog/digital representation system, such as in the design of a channel-compatible HDTV that is robust in the presence of channel degradation and that makes efficient use of bandwidth.

Figure 7A:
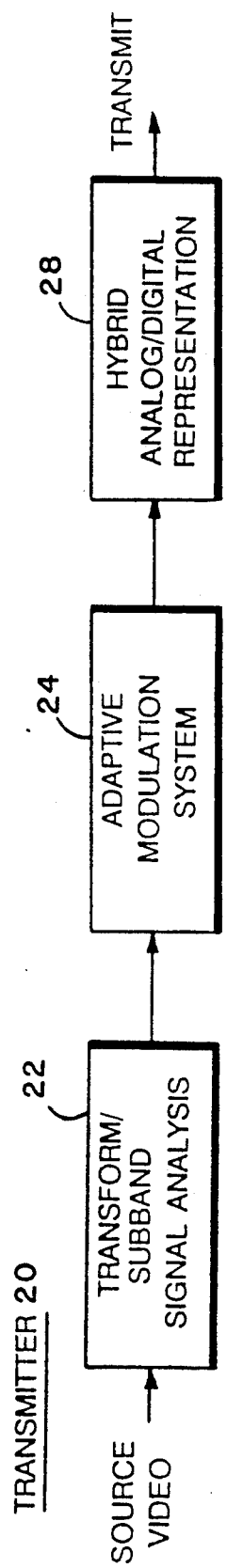
Figure 7B:
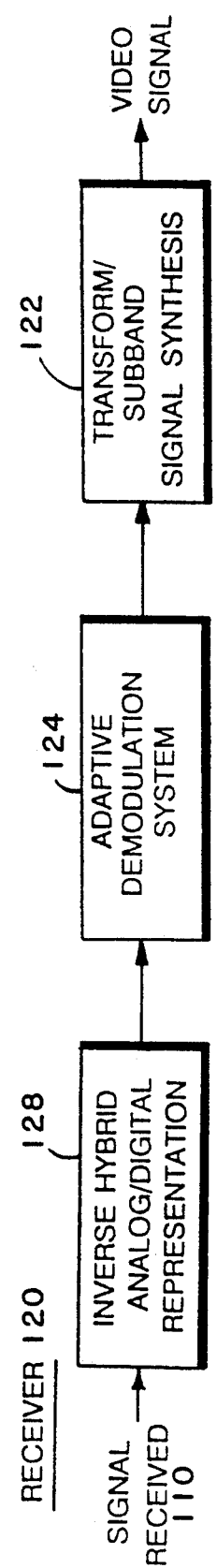

In an illustrative embodiment of the invention, shown in FIG. 7, source video signal 10 is applied to a transform/subband signal analyzer 22 of transmitter 20. The output is applied to an adaptive modulation system. The output of the adaptive modulation system contains both analog data (such as a modulated transmission signal) and digital data (such as the modulation factor necessary to demodulate the modulated transmission signal.) This analog and digital data are applied to a hybrid analog/digital representation processor 28. This data is now transmitted in the manner set forth hereinabove.

In the receiver of such a system, the received signal 110 is applied to inverse hybrid analog/digital representation processor 128 of receiver 120. The decoded analog/digital output is applied to adaptive demodulator 124. The demodulated signal is now applied to transform/subband synthesizer 122 to synthesize a representation of the original source video signal 10.

Figure 8:
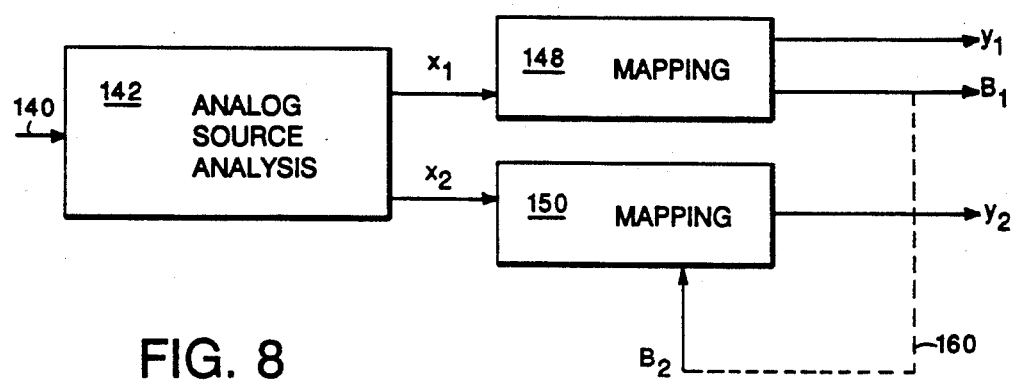
FIG. 8 is a block diagram of transmitting circuitry.

Referring to FIG. 8, circuit 142 analyzes an analog source signal 140 and generates analog values $x_1$ and $x_2$ which are components of the source signal (which could be the adaptively modulated transform coefficients discussed in connection with FIG. 7). Circuit 148 receives $x_1$ and maps it to an analog value $y_1$ in the expansion mode (FIGS. 1c and 1d). Circuit 148 then transmits $y_1$ and $B_1$ bits of digital information, such that a representation of $x_1$ can be generated. Circuit 150 receives analog value $x_2$ and maps it to analog value $y_2$ in the compression mode (FIG. 3). Analog value $y_2$ includes encoded $B_2$ bits of digital information (the $B_2$ bits could include bits representing the modulation factor used in adaptive modulation as discussed in connection with FIG. 7). Circuit 150 transmits $y_2$, such that it can be decoded to produce a representation of $x_2$ and of the $B_2$ bits of digital information. As represented by dotted line 160, the $B_1$ bits may be expressed in part by the $B_2$ bits (e.g., in the combination of modes 1 and 2 discussed in the paragraphs above). If all of $B_1$ is expressed in $B_2$, then it may not be necessary to transmit the $B_1$ bits. Rather, these bits would all be encoded as the $B_2$ bits.

Figure 9:
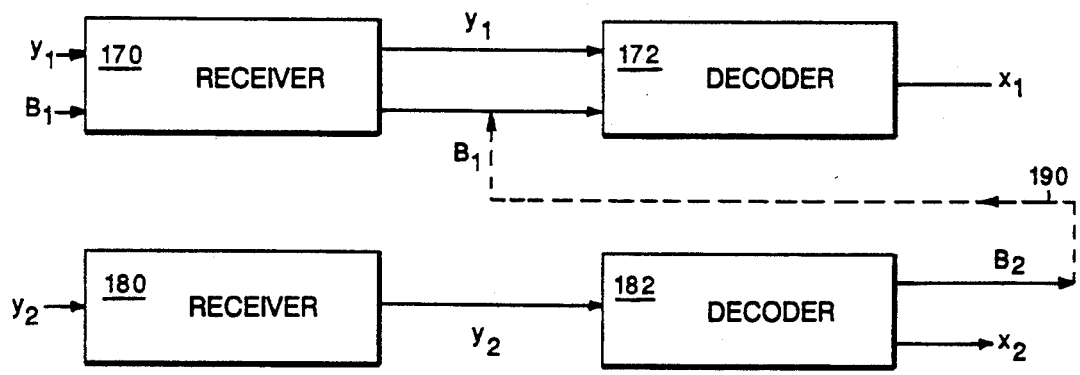
FIG. 9 is a block diagram of receiving circuitry.

Referring to FIG. 9, circuit 170 receives $y_1$ and the $B_1$ bits. Circuit 172 decodes the $B_1$ bits and $y_1$ to produce a representation $X_1$ of the component 148 (FIG. 8). As described above, $X_1$ will be similar to $x_1$, but with a higher signal-to-noise ratio (see FIGS. 2(f) and 2(g)). Circuit 180 receives $y_2$ which is then decoded by circuit 182. The decoded output includes $B_2$ bits and a representation $X_2$ of $x_2$. Representation $X_2$ has a lower signal-to-noise ratio, but digital information has been added (see FIGS. 4(d)-4(g)). The $B_2$ bits can be used by circuit 172, as represented by dotted line 190, to decode $y_1$. In this case, less digital information, or possibly no additional digital information, must be transmitted with $y_1$.

It will now be appreciated that the present invention in mode 1 enables transmission of a single analog value with a single expanded analog value and digital decoding information. It is further possible to transmit a single analog value and digital information in mode 2 with a single compacted analog value. In the combined mode 1 and mode 2 operation, the mode 2 digital information may be used to express the digital decoding information of mode 1. The above transmitting may take the form of representing a value perhaps for later transmission or other use. As a result, more robust and/or more efficient signal transmission may be achieved.

Other embodiments are within the following claims.

What is claimed is:

1. A hybrid analog/digital method of information signal transmission comprising the following steps:
   obtaining a first analog value $x_1$ which is desired to be transmitted;
   mapping the first analog value $x_1$ to an analog value $y_1$ and to $B_1$ bit(s) of digital information according to a first mapping function;
   transmitting the $B_1$ bit(s) of digital information; and
   transmitting analog value $y_1$ such that the analog value $y_1$ can be decoded using the $B_1$ bit(s) of digital information to obtain a representation of the first analog value $x_1$.

2. The method of claim 1 wherein obtaining first analog value $x_1$ includes submitting a source signal to transform or subband signal analysis to generate the analog value $x_1$, whereby the source signal may be synthesized from the representation of the analog value $x_1$.

3. The method of claim 2 wherein the first analog value $x_1$ comprises a representation of a high energy component of the source signal.

4. The method of claim 2 wherein the first analog value $x_1$ comprises a representation of a low-frequency component of the source signal.

5. The method of claim 2 or 3 or 4 wherein the source signal is a video signal or an audio signal.

6. The method of claim 1 or 2 further comprising the steps:
   obtaining a second analog value $x_2$ and $B_2$ bit(s) of digital information, both of which are desired to be transmitted;
   mapping the second analog value $x_2$ and $B_2$ bit(s) of digital information to an analog value $y_2$ according to a second mapping function; and
   transmitting the analog value $y_2$ such that a respective representation of both the second analog value $x_2$ and the $B_2$ bit(s) of digital information can each be discerned from analog value $y_2$, whereby second analog value $x_2$ and $B_2$ bit(s) of digital information can be transmitted with a single analog value $y_2$.

7. The method of claim 6 wherein obtaining the second analog value $x_2$ and $B_2$ bit(s) of digital information includes submitting a source signal to transform or subband signal analysis and processing the output such that the source signal can be represented with the analog value $x_2$ and $B_2$ bit(s) of digital information, whereby a representation of the source signal can be generated based upon the representation of second analog value $x_2$ and $B_2$ bit(s) of digital information discerned from analog value $y_2$.

8. The method of claim 7 wherein the second analog value $y_2$ comprises a representation of a low energy component of the source signal.

9. The method of claim 8 wherein the source signal is a video signal or an audio signal.

10. The method of claim 7 wherein the second analog value $y_2$ comprises a representation of a high-frequency component of the source signal.

11. The method of claim 7 wherein the source signal is a video signal or an audio signal.

12. The method of claim 7 wherein the source signal is a video signal or an audio signal.

13. The method of claim 7 wherein $x_1$ is a first analog component of a source signal and $x_2$ is a second analog component of a source signal, and wherein at least some of said $B_1$ bits are expressed by at least some of said $B_2$ bits, such that said $B_1$ bits and $B_2$ bits have portions in common, and $y_2$ includes said some of said $B_1$ bits.

14. The method of claim 6 wherein $x_1$ is a first analog component of a source signal and $x_2$ is a second analog component of a source signal, and wherein at least some of said $B_1$ bits are expressed by at least some of said $B_2$ bits, such that said $B_1$ bits and $B_2$ bits have portions in common, and $y_2$ includes said some of said $B_1$ bits.

15. The method of claim 14 wherein said source signal is a video signal or an audio signal.

16. The method of claim 15 wherein said first component is a low frequency component of said source signal, and said second component is a high frequency component of said source signal.

17. The method of claim 15 wherein said first component is a high energy component of said source signal, and said second component is a low energy component of said source signal.

18. A hybrid analog/digital information signal transmission system, comprising:
   means for obtaining a first analog value $x_1$ which is desired to be transmitted;
   means for mapping the first analog value $x_1$ to an analog value $y_1$ and $B_1$ bit(s) of digital information according to a first mapping function;
   means for transmitting the $B_1$ bit(s) of digital information; and
   means for transmitting analog value $y_1$ such that the analog value $y_1$ can be decoded using the $B_1$ bit(s) of digital information to obtain a representation of the first analog value $x_1$.

19. The system of claim 18 wherein the first analog value $x_1$ includes a representation of a high energy component of the source signal.

20. The system of claim 18 wherein the first analog value $x_1$ includes a representation of a low-frequency component of the source signal.

21. The system of claim 18 wherein the source signal is a video signal or an audio signal.

22. The system of claim 18 further comprising:
   means for obtaining a second analog value $x_2$ and $B_2$ bit(s) of digital information, both of which are desired to be transmitted;
   means for mapping the second analog value $x_2$ and $B_2$ bit(s) of digital information to an analog value $y_2$ according to a second mapping function; and
   means for transmitting the analog value $y_2$ such that a respective representation of both the second analog value $x_2$ and the $B_2$ bit(s) of digital information can each be discerned from analog value $y_2$, whereby second analog value $x_2$ and $B_2$ bit(s) of digital information can be transmitted with a single analog value $y_2$.

23. The system of claim 22 wherein said means for obtaining the second analog value $x_2$ and $B_2$ bit(s) of digital information includes means for submitting a source signal to transform or subband signal analysis and processing the output of the analysis such that the source signal can be represented with the analog value $x_2$ and $B_2$ bit(s) of digital information, whereby a representation of the source signal can be generated based upon a representation of second analog value $x_2$ and $B_2$ bit(s) of digital information discerned from analog value $y_2$.

24. The system of claim 23 wherein $x_1$ is a first analog component of a source signal and $x_2$ is a second analog component of a source signal, and wherein at least some of said $B_1$ bits are expressed by at least some of said $B_2$ bits, such that said $B_1$ bits and $B_2$ bits have portions in common, and $y_2$ includes said some of said $B_1$ bits.

25. The system of claim 22 wherein the second analog value $y_2$ includes a representation of a high-frequency component of the source signal.

26. The system of claim 22 wherein the second analog value $y_2$ includes a representation of a low energy component of the source signal.

27. The system of claim 22 wherein the source signal is a video signal or an audio signal.

28. The system of claim 22 wherein $x_1$ is a first analog component of a source signal and $x_2$ is a second analog component of a source signal, and wherein at least some of said $B_1$ bits are expressed by at least some of said $B_2$ bits, such that said $B_1$ bits and $B_2$ bits have portions in common, and $y_2$ includes said some of said $B_1$ bits.

29. A system for receiving a transmission signal which is a hybrid analog/digital representation of a first analog value $x_1$ which is representative of a first component of a source signal, the system comprising:
   a circuit for receiving the transmission signal and obtaining an analog value $y_1$ and $B_1$ bit(s) of digital information representative of the first analog value $x_1$,
   a circuit for generating a representation of first analog value $x_1$ by using the $B_1$ bit(s) of digital information and analog value $y_1$, wherein said analog value $y_1$ is related to analog value $x_1$ according to a mapping function, and
   a circuit for generating said representation of a first component of a source signal based upon said first analog value $x_1$.

30. The system of claim 29 wherein the transmitted signal has been generated by transform or subband signal analysis of the source signal.

31. The system of claim 29 further comprising a second system for receiving a second transmission signal which is an analog representation of a second analog value $x_2$ and $B_2$ bit(s) of digital information, which are representative of a second component of said source signal, the second system comprising:
   a circuit for receiving the second transmission signal and obtaining an analog value $y_2$ representative of both the second analog value $x_2$ and the $B_2$ bit(s) of digital information,
   a circuit for generating a representation of second analog value $x_2$ and $B_2$ bit(s) of digital information based upon analog value $y_2$ according to a second mapping function, and
   a circuit for generating a representation of said second component of the source signal based upon the representation of second analog signal $x_2$ and the $B_2$ bit(s) of digital information.

32. The system of claim 31 wherein the transmitted signal has been generated by transform or subband signal analysis of the source signal.

33. The system of claim 29 wherein the source signal is a video signal or an audio signal.

* * * * *

UNITED STATES PATENT AND TRADEMARK OFFICE
CERTIFICATE OF CORRECTION

PATENT NO.   : 5,309,478

DATED        : May 3, 1994

INVENTOR(S)  : Jae S. Lim

It is certified that error appears in the above-identified patent and that said Letters Patent is hereby corrected as shown below:

Column 7, line 36, "1d" should be --1b--.

Signed and Sealed this

Twenty-fifth Day of October, 1994

Attest:

BRUCE LEHMAN

Attesting Officer

Commissioner of Patents and Trademarks